United States Patent

See

[11] Patent Number: 5,941,596
[45] Date of Patent: Aug. 24, 1999

[54] LIGHT-TRANSMISSIVE VEHICLE BODY FRAME

[76] Inventor: Brian See, 39 Worcester Lane, Sutton Coldfield, West Midlands B75 5NA, United Kingdom

[21] Appl. No.: 08/908,509

[22] Filed: Aug. 7, 1997

Related U.S. Application Data

[63] Continuation of application No. 08/596,272, filed as application No. PCT/GB94/01736, Aug. 8, 1994, abandoned.

[30] Foreign Application Priority Data

Aug. 10, 1993 [GB] United Kingdom ................... 9316542

[51] Int. Cl.$^6$ .................................................. B62D 25/00
[52] U.S. Cl. .......................................... 296/201; 296/901
[58] Field of Search ............................. 296/203.01, 84.1, 296/96.12, 96.18, 96.21, 146.15, 201, 215, 901; 52/735.1, 204.593, 204.597, 204.62, 204.67, 734.2

[56] References Cited

U.S. PATENT DOCUMENTS

| | | | |
|---|---|---|---|
| 2,043,756 | 6/1936 | Lalancette | 296/96.12 |
| 3,789,564 | 2/1974 | Kessler | 52/204.62 X |
| 3,843,982 | 10/1974 | Lane et al. | 296/96.21 X |
| 4,041,208 | 8/1977 | Seeger et al. | 296/84.1 X |
| 4,988,142 | 1/1991 | Chandler et al. | 296/146 |
| 5,003,733 | 4/1991 | Strobl, Jr. et al. | 52/86 |
| 5,107,646 | 4/1992 | Tamura | 296/84.1 X |
| 5,364,685 | 11/1994 | Nakashima et al. | 269/284.1 X |
| 5,451,090 | 9/1995 | Brodie et al. | 296/201 X |
| 5,561,340 | 10/1996 | Jin et al. | 313/309 |

FOREIGN PATENT DOCUMENTS

| | | |
|---|---|---|
| 293265 | 11/1988 | European Pat. Off. . |
| 754829 | 4/1954 | United Kingdom . |
| 2214218 | 8/1989 | United Kingdom . |

*Primary Examiner*—Andrew C. Pike
*Attorney, Agent, or Firm*—Reising, Ethington, Barnes, Kisselle, Learman & McCulloch, P.C.

[57] ABSTRACT

A vehicle body support frame structure includes pillar portions supporting an upper decking portion of the structure and mounting associated glazing panels. The pillar portions are constructed from a light-transmissive structural material that provide the needed support to the upper decking portion and glazing panels while allowing light to be transmitted through the pillar portions so as not to obstruct the view of an operator of the vehicle.

5 Claims, 3 Drawing Sheets

LIGHT-TRANSMISSIVE VEHICLE BODY FRAME

This application is a continuation of application Ser. No. 08/596,272, filed Feb. 7, 1996, now abandoned which is a 371 of PCT/GB94/01736 filed Aug. 8, 1994.

This invention relates to vehicle body superstructures and more specifically to structural members used to form load carrying posts or pillars of windscreen or other window assemblies of the superstructure incorporating glazing or transparent panels. Said members for the above applications are hereinafter referred to "window members" and said assemblies or other structures incorporating those members and said glazing or panels are hereinafter referred to as "window assemblies". The invention is directed more specifically toward the window framing structure of the vehicles.

BACKGROUND OF THE INVENTION

U.S. Pat. No. 4,988,142 discloses a vehicle door having a rigid window frame forming the upper edge part of the door, said frame being transparent; and a windowscreen overlying and concealing structural windshield pillars which support the vehicle roof. Transparent seals are provided between the movable window of the door and said transparent frame. While this arrangement may provide improvements in appearance and aesthetic appeal, it does not provide any safety improvement because front-to-side vision is obstructed by the structural pillars inside the windscreen and those parts of that screen which conceal them from outside.

SUMMARY OF THE INVENTION

The object of the invention is to provide window members and window assemblies which give improved visibility and thus increase safety in road vehicles, boats, and aircraft; which improve illumination by reducing obstruction of outside light; and which can also be used to improve the appearance and aesthetic appeal in the design of vehicles. The invention further contemplates a vehicle construction incorporating such a light-transmissive body frame.

BRIEF DESCRIPTION OF THE DRAWINGS

Some examples of the invention and its application are now more particularly described with reference to the accompanying drawings wherein.

DETAILED DESCRIPTION OF THE PREFERRED EMBODIMENT

Figure 1:
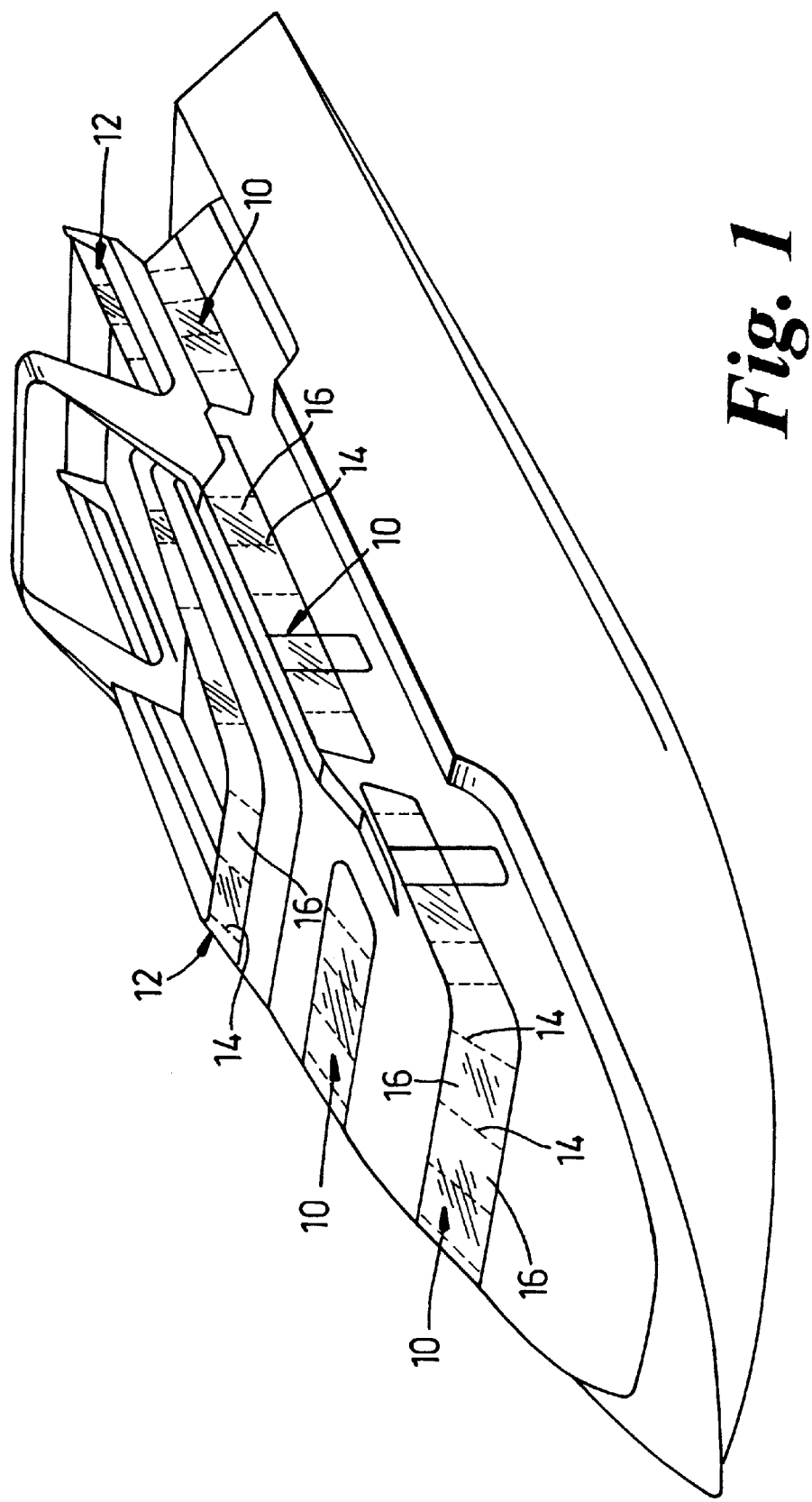
FIG. 1 is a perspective view of a boat incorporating window assemblies of the invention.
Figure 4:
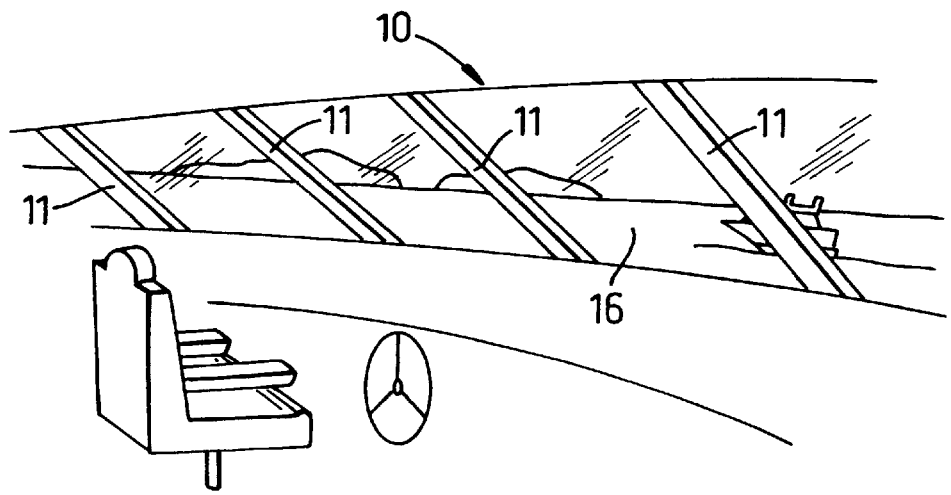
FIG. 4 is a view from the bridge or control position of a boat with window assemblies of conventional design.

Taking firstly the example of a watercraft vehicle such as a boat, one form of which is illustrated in FIG. 1, the body frame support structure as conventionally built includes side and forward window assemblies 10 and glazed upper deck screen window assemblies 12 supported by vertical pillars which normally would be constructed of an opaque load-bearing material such as wood, metal, or similar material and arranged at intervals for the integrity of the body structure, to bear the weight of any decking and the like above the windows, and to support the glazing 16 of the window itself against wind and wave pressure. Thus the view from the bridge or control position of a conventional boat of this type, shown in FIG. 4, will be substantially obstructed by these solid pillars 11 (FIG. 4) with the risk that hazards ahead may be obscured, even if only momentarily, with resultant danger particularly when running at high speed. Similar problems and dangers occur with motor vehicles where pillars, particularly the forwardmost "A" posts at each side of the front windscreen, may cause blind spots to the driver.

In accordance with the invention the boat shown in FIG. 1 substantially avoids these problems and also has a more pleasing appearance. Each window member includes vertical posts or support pillars 14 (shown in broken lines in the drawing) which receive the substantially vertical edges of an associated piece of glass or other glazing material 16. The support pillars 14 are fabricated as an extrusion or molding of a structurally stable load bearing light-transmissive (i.e., transparent or translucent) material such as, for example, a transparent plastic material which is tough and weather-resistant. Composite laminated and/or fiber-reinforced transparent materials might also be used.

The cross-sectional profile of each post 14 defines glazing rebates 20 (FIG. 2) for receiving the edges of the glass or other glazing material 16 and these rebates may accommodate sealing channels 22 and/or flexure type sealing lips 24 to seat the edges of the glass and keep them weathertight, these inserts and lips also being formed from light-transmissive material such as transparent resilient silicone-based or other plastics materials. A transparent window member for a double glazed window assembly is shown in FIG. 3.

Depending on the shape and application required the window members may be formed by extrusion, pressing, or molding or may be built up as a composite structure either custom-built to suit the particular application or in a standard format.

Figure 2:
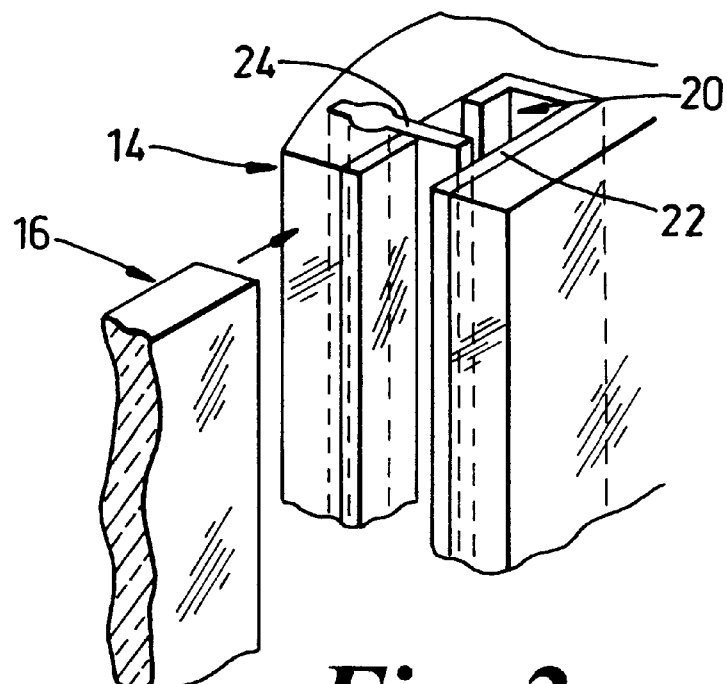
FIG. 2 is a perspective sectional view of part of a window member of the invention and associated glazing.
Figure 3:
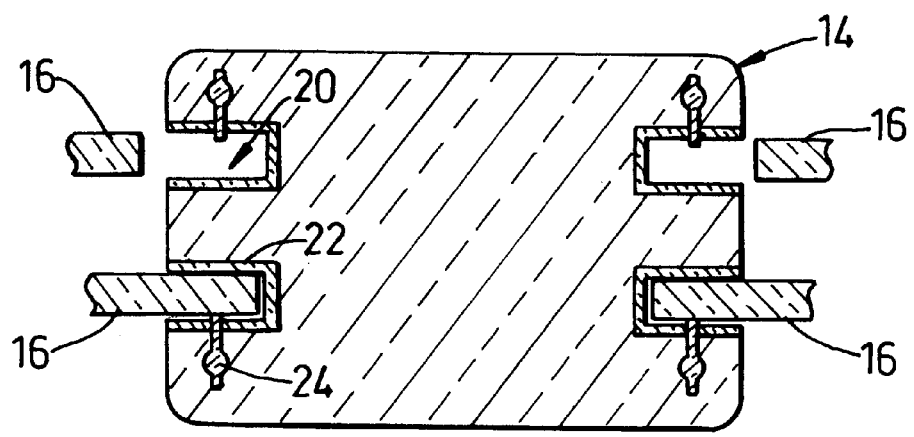
FIG. 3 is a cross section of another form of window member and glazing.

Straight or curved members can be provided; and whilst solid cross sections are shown in FIGS. 2 and 3, hollow wall cellular sections are also contemplated.

The shape of the members may be selected to minimize optical distortion of the view therethrough but it will be appreciated that, even if the view through the window member is not so clear as through the glazing itself, sight is not completely obstructed as is the case with conventional constructions.

Moreover, both the interior and exterior appearance and lighting are greatly improved as the heaviness of solid window members is absent in exterior view so that a window assembly which in fact has intermediate structural window members is given the appearance of a continuous "wrap around" or picture window or screen; but light transmission is also substantially increased so that interior lighting is improved.

The latter is true even if tinted or light transmissive (e.g., transparent) load-bearing material according to the invention are employed; for some applications, a degree of contrast between the glazing itself and the window members may be a desirable design feature.

Figure 5:
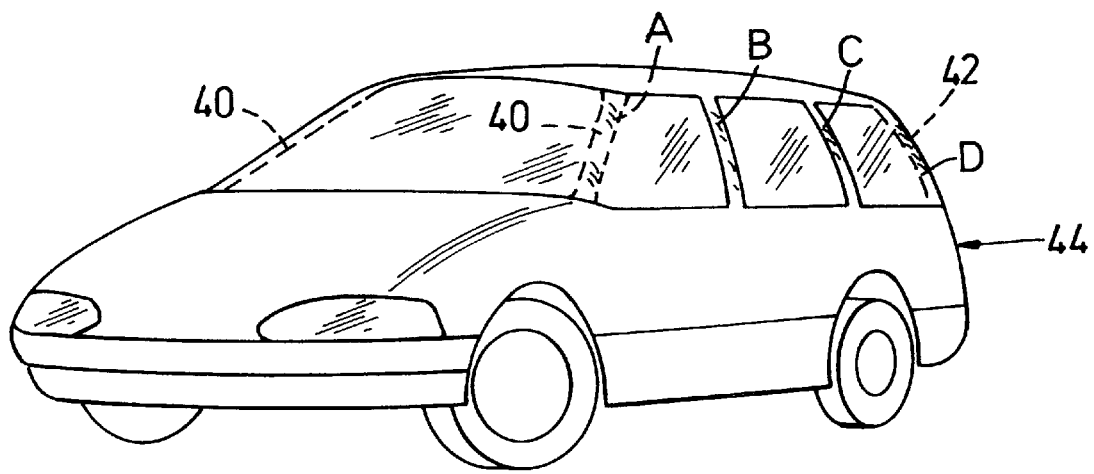
FIG. 5 is a perspective view of a road vehicle incorporating the invention.

FIG. 5 shows a road vehicle and some or all of the vertical posts A-D may be transparent or translucent window members, in particular the A posts 40 at the front corners to each side of the windscreen and the rearmost D posts 42 of the estate type body 44 shown, which will provide increased safety in removing blind spots in both forward and rearward vision.

I claim:

1. A vehicle comprising a lower body portion having opposite sides joined to a forward end; an upper decking portion overlying said body portion and having opposite sides joined to a forward end; a plurality of upstanding transparent pillars at the opposite sides of said body portion, said pillars being connected to the opposite sides of said upper decking portion and supporting said upper decking portion at a level above that of said body portion to provide a space between said body portion and said upper decking portion at the forward end of said upper decking portion; a transparent glazing panel occupying said space and being secured at opposite sides thereof to two of said pillars, the transparency of said pillars and said glazing panel enabling unobstructed vision through said pillars and said glazing panel, said two of said pillars including rebates accommodating the opposite sides of said glazing panel; and transparent sealing inserts accommodated within said rebates to provide a seal between said two of said pillars and said glazing panel.

2. The vehicle according to claim 1 wherein said pillars are formed from composite laminated material.

3. The vehicle according to claim 1 wherein the pillars are fabricated from fiber-reinforced material.

4. The vehicle according to claim 1 wherein said pillars comprise extruded members.

5. The vehicle according to claim 1 wherein said pillars comprise molded members.

* * * * *